United States Patent
Lee et al.

(10) Patent No.: US 7,987,315 B2
(45) Date of Patent: Jul. 26, 2011

(54) DATA STORAGE APPARATUS WITH BLOCK RECLAIM FOR NONVOLATILE BUFFER

(75) Inventors: Shea-Yun Lee, Seoul (KR); Dong-Kun Shin, Seoul (KR); Dong-Hyun Song, Gyeonggi-do (KR); Jang-Hwan Kim, Suwon-si (KR); Jeong-Eun Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 678 days.

(21) Appl. No.: 11/668,412

(22) Filed: Jan. 29, 2007

(65) Prior Publication Data
US 2007/0186065 A1    Aug. 9, 2007

(30) Foreign Application Priority Data
Feb. 3, 2006    (KR) .................... 10-2006-0010842

(51) Int. Cl.
*G06F 12/12*    (2006.01)
(52) U.S. Cl. .................... 711/103; 711/113; 711/159
(58) Field of Classification Search .................. None
See application file for complete search history.

(56) References Cited

U.S. PATENT DOCUMENTS

| | | | |
|---|---|---|---|
| 5,542,066 A * | 7/1996 | Mattson et al. ............... | 711/136 |
| 5,860,124 A | 1/1999 | Matthews et al. | |
| 5,867,641 A * | 2/1999 | Jenett ............................. | 714/7 |
| 6,014,724 A * | 1/2000 | Jenett ............................. | 711/103 |
| 6,219,752 B1 | 4/2001 | Sekido | |
| 6,487,563 B1 | 11/2002 | Houldsworth | |
| 6,725,342 B1 | 4/2004 | Coulson | |
| 6,785,767 B2 | 8/2004 | Coulson | |
| 6,839,823 B1 * | 1/2005 | See et al. ....................... | 711/171 |
| 6,901,479 B2 | 5/2005 | Tomita | |
| 7,185,069 B2 * | 2/2007 | Costin et al. .................. | 709/219 |
| 2006/0242382 A1 * | 10/2006 | Griess et al. .................. | 711/170 |

FOREIGN PATENT DOCUMENTS

| | | |
|---|---|---|
| JP | 06-259292 | 9/1994 |
| JP | 10-154101 | 6/1998 |
| JP | 11-53235 | 2/1999 |
| JP | 11-53261 | 2/1999 |
| JP | 2002-540503 | 11/2002 |
| JP | 2003-122630 | 4/2003 |
| JP | 2003-223284 | 8/2003 |
| JP | 2003-256289 | 9/2003 |
| KR | 1999-0023182 | 3/1999 |
| KR | 2000-0048766 | 7/2000 |
| KR | 2001-0043785 | 5/2001 |
| WO | WO 00/57277 | 9/2000 |

* cited by examiner

*Primary Examiner* — Gary J Portka
(74) *Attorney, Agent, or Firm* — Myers Bigel Sibley & Sajovec, P.A.

(57) ABSTRACT

An embodiment of a data storage apparatus includes a storage medium, a flash memory buffer configured to store write data to be written in the storage medium, and a controller configured to compare the amount of unused space in the flash memory buffer to a first reference value, compare the amount of valid data in the flash memory buffer to a second reference value, and in response to the comparisons, conducts either a block reclaim operation on the flash memory buffer or a buffer flush operation to transfer valid data from the flash memory buffer to the storage medium. An embodiment of a method for managing a data storage apparatus includes determining when to perform a reclaim operation on a nonvolatile memory buffer, and performing the reclaim operation by moving data either physically or virtually within the nonvolatile memory buffer.

16 Claims, 11 Drawing Sheets

DATA STORAGE APPARATUS WITH BLOCK RECLAIM FOR NONVOLATILE BUFFER

CROSS-REFERENCE TO RELATED APPLICATIONS

This U.S. non-provisional patent application claims priority under 35 U.S.C. §119 of Korean Patent Application No. 2006-10842 filed on Feb. 3, 2006, the entire contents of which are hereby incorporated by reference.

BACKGROUND

The present invention disclosed herein relates to data storage apparatus and more particularly, to a data storage apparatus equipped with a nonvolatile memory as a write buffer.

A data storage apparatus such a hard disc drive (HDD) generally employs a semiconductor memory as a write buffer. A typical write buffer for a data storage apparatus may employ, for example, a volatile memory such as a dynamic random access memory (DRAM). In most cases, the write buffer is usually designed to minimize the time required for scanning a disc head by rearranging data write requests from a host. In a write buffer that uses a volatile memory such as a DRAM, data stored in the write buffer is lost when the power supply is interrupted or suspended. Because of this, write data transferred from the host should only be stored for a short time in a write buffer that uses volatile memory.

To extend the amount of time data can be stored, a write buffer may be implemented with a nonvolatile memory such a flash memory. In this case, it is possible to buffer data for a relatively long time because the flash memory is able to retain data stored therein, even without a power supply. Therefore, data provided from a host are able to be preserved in the write buffer even if the power supply to the storage medium such a disc is interrupted. When a nonvolatile memory is used as the write buffer, it is possible to reduce the power consumption of the storage apparatus by limiting the amount of time spend driving a spindle motor that consumes most of the power used by an HDD. And, by fixing the head media to a stable position of the disc, it is possible to reduce problems due to shock or vibration caused by moving or carelessly handling the system. Further, it helps improve endurance by reducing operating time of mechanical elements in the disc.

FIG. 1 is a block diagram showing a computer system having a data storage apparatus. Referring to FIG. 1, the computer system includes a data storage apparatus 1 and a host 7. For example, the host 7 may include mobile a computing apparatus such as a notebook computer. The data storage apparatus 1 is comprised of a write buffer 2, a disc 3, a spindle motor 4 for driving the disc 3, and a controller 8. The disc 3, as shown in FIG. 1, includes head media 5 and a magnetic storage medium 6. The controller 8 is configured to regulate data transmission between the disc 3 and the write buffer 2, and between the disc 3 and the host 7.

When the data storage apparatus 1 receives a request for a data write operation from the host (e.g., a notebook computer) 7, data to be written (hereinafter, referred to as 'write data') are stored in the write buffer 2, which includes a nonvolatile memory, under regulation by the controller 3 as long as there is unused space for storage in the write buffer 2. If there is enough space in the write buffer 2, the data does not need to be written to the disc 3. Thus, it is permissible to interrupt the power supplied to the spindle motor 4 that drives the disc 3, and to improve efficiency by reducing power consumption by suspending the spindle motor 4 for a long time. It is possible to further reduce power consumption by interrupting the power supply to the whole body of the magnetic storage medium 6. And, by displacing the head media 5 from the magnetic storage medium 6 while suspending the spindle motor 4 for a long time, it is possible to reduce the probability of problems due to shock or vibration caused by moving or carelessly treating the system.

When the write buffer 2 is implemented with a nonvolatile memory such as a flash memory, it may be managed in the following manner. In general, a flash memory has two operational characteristics: sequentially writing data in a memory block; and inhibiting data to be overwritten in the same locations that have already been written. The write data transferred from the host 7 are sequentially written in the write buffer 2 in the order of requested time points. For instance, as illustrated in FIG. 2, as successive requests for data writing operations are received from the host 7, it reduces the volume of unused space in the write buffer 2. If the unused space is insufficient in the write buffer 2, data is moved from the write buffer 2 into the storage medium so as to flush or empty the write buffer 2. This is referred to as a 'buffer flush operation.' During the buffer flush operation, power must be supplied to the disc 3 so as to store data from the write buffer 2 to the disc 3.

If data on the disc 3, which are assigned to the same addresses as the write data transferred from the host 7, have been already written in the write buffer 2, newly requested write data are sequentially written in the write buffer 2 and previously written data, which has been written to the disk, are regarded as old data and designated as invalid (or nullified).

The invalid (or nullified) data are a result of the operational characteristic of the flash memory, i.e., the old data are inhibited (cannot be overwritten) at the same positions in the flash memory. As illustrated in FIG. 3A, if there is a request from the host 7 for a writing operation for data which are assigned to the same addresses with the data previously written in the write buffer 2, new write data transferred from the host 7 are sequentially written in the write buffer 2, and the previously-written data become invalid (see the hatched portions in FIGS. 3A and 3B) because it is not permissible to overwrite data in the flash memory. A data write request to the same address may be frequent for metadata and the file system of the host 7. Thus, when there are frequent data write requests to the same addresses over time, as shown in FIG. 3B, the invalid data appear in large numbers in various positions in the flash memory that makes up the write buffer 2.

As mentioned above, if data, including valid and invalid data, occupy a large amount of space in the write buffer 2, the write buffer 2 is only left with a small volume of unused space. In this case, it is necessary to move valid data to the disc 3 by way of the buffer flush operation as mentioned above to assure unused space for new write data in the write buffer 2.

However, as stated above, the buffer flush operation inevitably consumes power to actuate the spindle motor 4. Such frequent buffer flush operations increase the rate of power consumption by the data storage apparatus 1. Therefore, it reduces the recharge interval of a battery used for supplying power to a mobile computing system. This reduces the battery operating time and degrades the endurance of the data storage apparatus because of shock or vibrations due to movement.

As a result, a new technique is needed for managing the write buffer in order to lengthen the recharge interval of the battery and to improve the endurance of the data storage apparatus.

SUMMARY

The present invention is directed to a data storage apparatus capable of reducing power consumption and a method for managing the same. Some embodiments of the present invention may provide a data storage apparatus capable of reclaiming and reusing a nullified space for storage and a method for managing the same. Some embodiments may provide a data storage apparatus improving it performance with reducing a frequency of buffer flush operations and a method for managing the same.

One aspect of the present invention is a data storage apparatus including a storage medium, a flash memory buffer configured to store write data to be written in the storage medium, and a controller configured to regulate a data transfer operation between the flash memory buffer and the storage medium, wherein the controller compares the amount of unused space in the flash memory buffer to a first reference value and compares the amount of valid data in the flash memory buffer to a second reference value, and in response to the comparisons, conducts either a block reclaim operation on the flash memory buffer or a buffer flush flash operation to transfer valid data from the flash memory buffer to the storage medium.

In some embodiments, the controller receives an external request for a data transfer operation during a block reclaim operation, the controller suspends the block reclaim operation to conduct the requested data transfer operation. The controller may resume the suspended block reclaim operation if an additional request for a data transfer operation is not received during a predetermined time.

In some embodiments, when the amount of unused space in the flash memory buffer is less than the first reference value and the amount of valid data in the flash memory buffer is less than the second reference value, the controller begins the block reclaim operation on memory blocks storing invalid data in the flash memory buffer. In some embodiments, when the amount of unused space in the flash memory buffer in less than the first reference value and the amount of valid data in the flash memory buffer greater than the second reference value, the controller conducts the buffer flush operation to move valid data from the flash memory buffer into the storage medium.

In some embodiments, when the flash memory buffer is managed in accordance with a physical address mapping, memory blocks storing invalid data are reclaimed and reused by shifting a base pointer by one or more memory blocks into an unused space and copying data from a memory block designated by a previous base pointer into a memory block designated by the current base pointer. The block reclaim operation for reclaiming the memory blocks storing the invalid data may be carried out with reference to information about the number of pages and a start address of valid data stored in an active page list table.

In some embodiments, when the flash memory buffer is managed in accordance with a logical address mapping, memory blocks storing invalid data are reclaimed and reused by removing a logical-physical address mapping of a memory block having only invalid data and altering a logical-physical address mapping of a memory block having at least a page storing valid data. When a first memory block stores both valid and invalid data, the first memory block may be reclaimed and reused by copying valid data from the first memory block into an empty memory block, rendering the first memory block as an invalid block, and removing a logical-physical address mapping of the first memory block.

Another aspect of the present invention is a method for managing a data storage apparatus having a storage medium and a flash memory buffer for storing data to be written into the storage medium, the method comprising determining whether unused space occupies the flash memory buffer at a rate lower than a first reference value, determining whether a valid data rate in the flash memory buffer is lower than a second reference value when the unused space occupies the flash memory buffer at a rate smaller than the first reference value, and conducting a block reclaim operation on the flash memory buffer when the valid data rate in the flash memory buffer is lower than the second reference value.

In some embodiments, the method may further include conducting a buffer flush operation on valid data in the flash memory buffer when the valid data rate is higher than the second reference value. In some embodiments, the method may further include determining whether there is an external request for a data transfer operation during the block reclaim operation. When there is an external request for a data transfer operation, the block reclaim operation may be suspended. After a predetermined time following completion of the requested data transfer operation, the suspended block reclaim operation may be resumed.

In some embodiments, when the flash memory buffer is managed in accordance with a physical address mapping, memory blocks storing invalid data are reclaimed and reused by shifting a base pointer by one or more memory blocks into an unused space and copying data from a memory block designated by a previous base pointer into a memory block designated by the current base pointer. The block reclaim operation for reclaiming the memory blocks storing the invalid data may be carried out with reference to information about the number of pages and a start address of valid data stored in an active page list table.

In some embodiments, when the flash memory buffer is managed in accordance with a logical address mapping, memory blocks storing invalid data are reclaimed and reused by removing a logical-physical address mapping of a memory block having only invalid data and altering a logical-physical address mapping of a memory block having at least a page storing valid data. When a first memory block stores both valid and invalid data, the first memory block may be reclaimed and reused by copying valid data from the first memory block into an empty memory block, rendering the first memory block as an invalid block, and removing a logical-physical address mapping of the first memory block.

Another aspect of the present invention relates to a method for managing a data storage apparatus having a storage medium and a nonvolatile memory buffer for storing data to be written into the storage medium, the method comprising determining when to perform a reclaim operation on the nonvolatile memory buffer, and performing the reclaim operation by moving data within the nonvolatile memory buffer. In some embodiments, moving data may comprise physically moving data by copying the data from a first block to a second block in the nonvolatile memory buffer. In other embodiments, moving data may comprise virtually moving data by changing logical-physical address mappings. The method may further include performing a physical garbage block collection on a memory block having both valid and invalid data in the nonvolatile memory buffer.

A further understanding of the nature and advantages of the present invention herein may be realized by reference to the remaining portions of the specification and the attached drawings.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified. In the figures.

DETAILED DESCRIPTION

Figure 1:
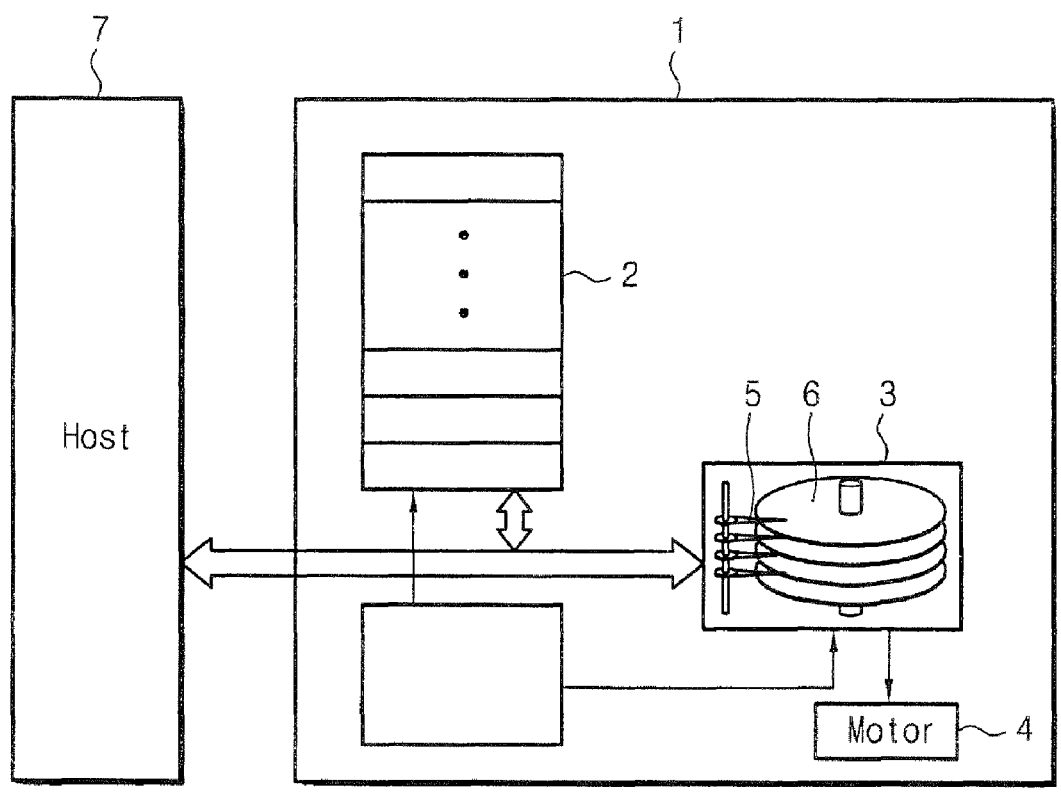
FIG. 1 is a block diagram showing a computer system having a data storage apparatus.
Figure 2:
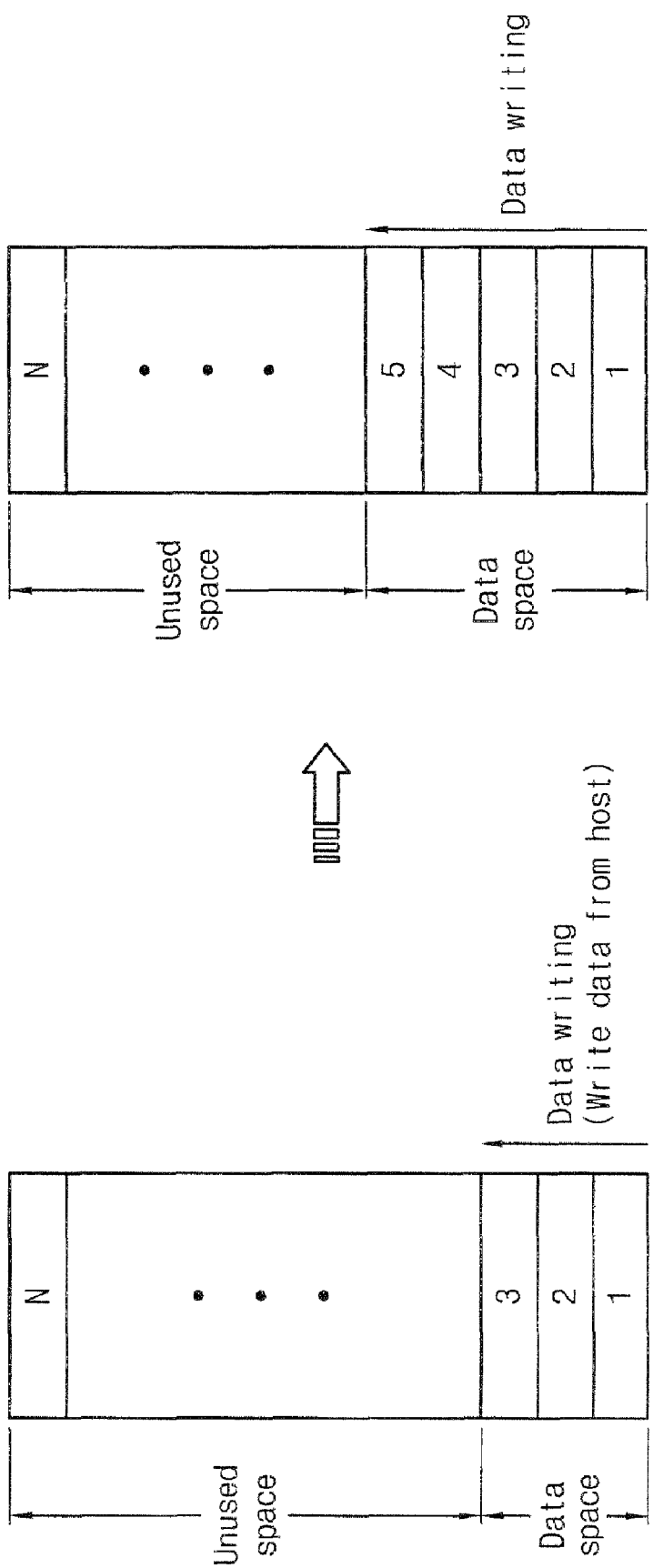
FIGS. 2, 3A and 3B are schematic diagrams illustrating a buffer flush operation of the data storage apparatus shown in FIG. 1.
Figure 3:
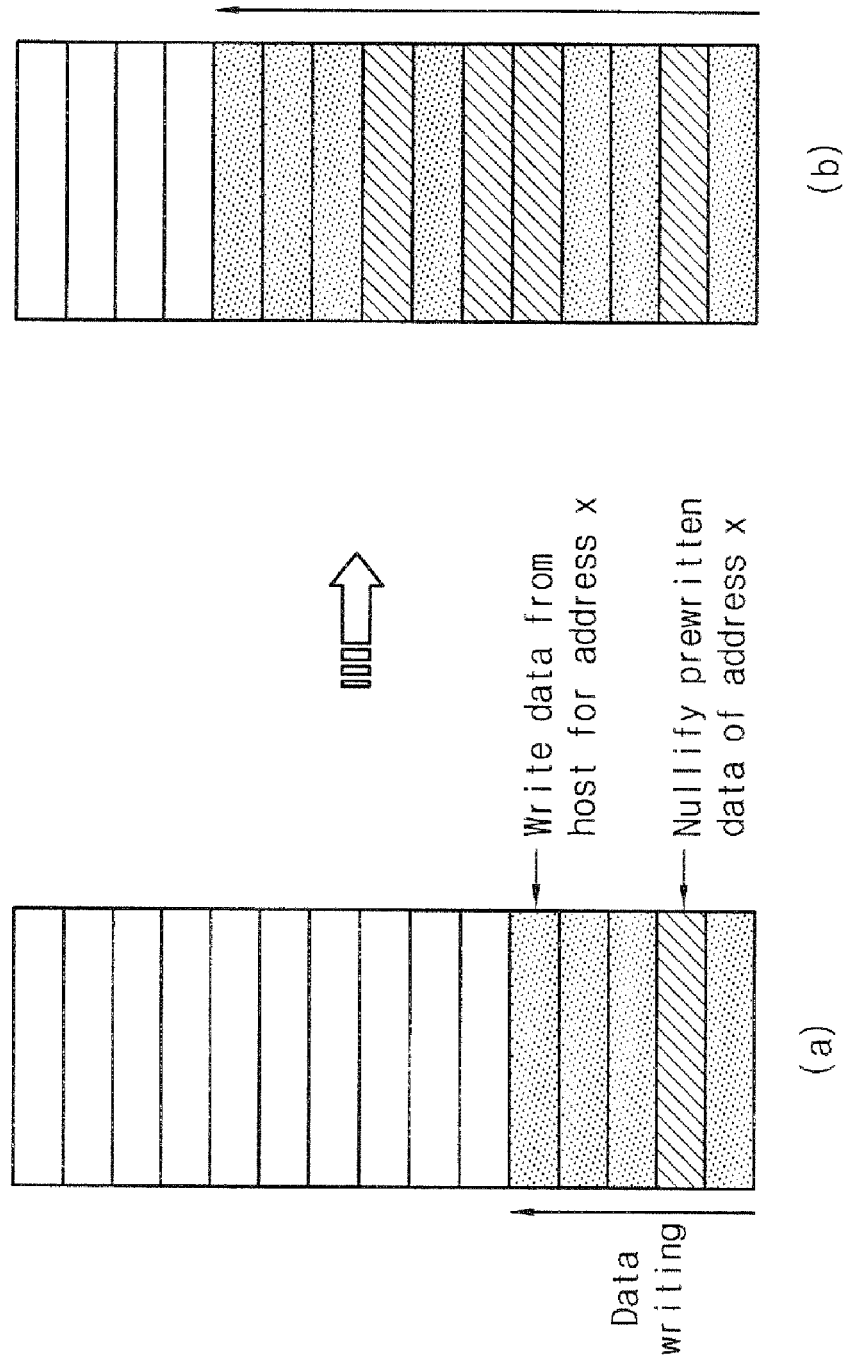

Preferred embodiments of the present invention will be described below in more detail with reference to the accompanying drawings, being involved in a flash memory as a write buffer for example. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout the figures.

Figure 4:
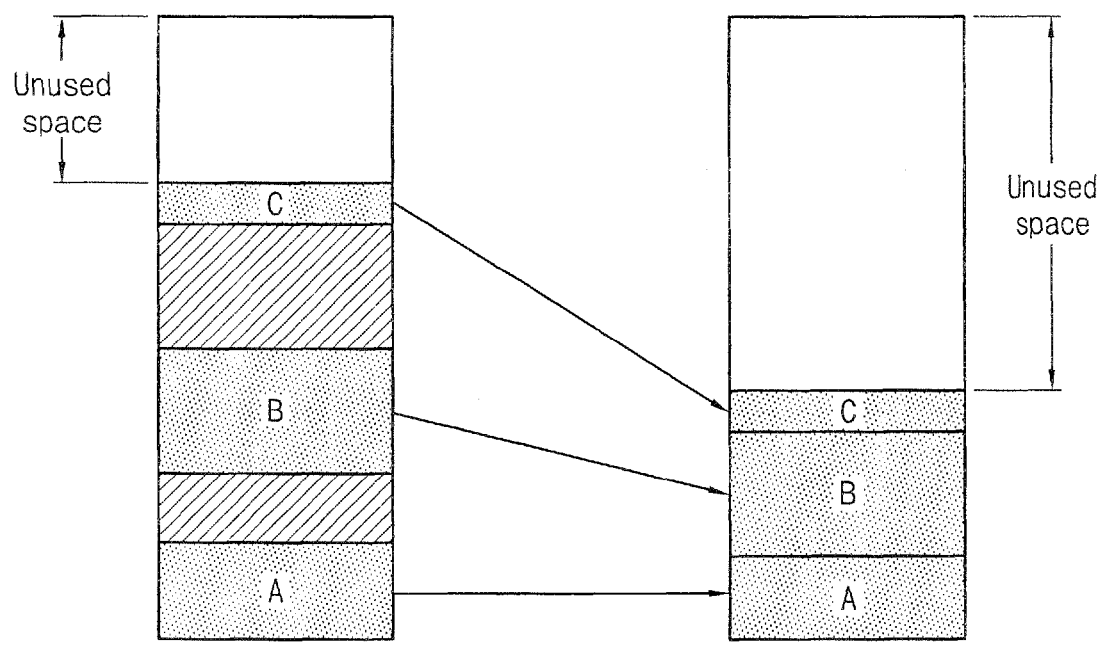
FIG. 4 is a schematic diagram illustrating a block reclaim operation of the data storage apparatus shown in FIG. 1.

An embodiment of a data storage apparatus according to the present invention is comprised of a write buffer made from a nonvolatile memory such a flash memory, being operable in a block reclaim mode that allows reclaiming and reusing spaces storing nullified or invalid data. In other words, as data begin to occupy a large volume of space for storage in the write buffer, as illustrated in FIG. 4, the volume of unused space becomes smaller therein (or the unused space becomes smaller in terms of a rate, or percentage, of the whole storage space of the write buffer). In this case, according to an embodiment of data storage apparatus according to the present invention, it is possible to reclaim unused spaces by means of a block reclaim technique, which will be described later, without conducting a buffer flush operation. A block reclaim technique according to the present invention minimizes the frequency of buffer flush operations (or lengthens intervals between the buffer flush operations), which greatly reduces the consumption of power to a storage medium (e.g., to a spindle motor driving a HDD). Thus, it is possible to maximize the efficiency and reduce power consumption in the data storage apparatus and to further strengthen the endurance of the data storage apparatus through the least actuation of mechanical components.

A block reclaim technique according to the present invention may be applied to a data storage apparatus managing the write buffer by means of physical or virtual address mappings. But, it will be understood that a block reclaim technique according to the present invention is not restrictive hereto. First, hereinafter will be described a block reclaim operation of the data storage apparatus using physical address mapping.

Physical address mapping means an arrangement in which logically successive memory blocks of the flash memory are assigned even to physically successive memory blocks. When physical address mapping is used in managing the memory blocks of the flash memory functioning as the write buffer, the data storage apparatus of the present invention is configured to reclaim and reuse memory blocks storing invalid data by managing the memory blocks of the write buffer in the form of circular queue.

Figure 5:
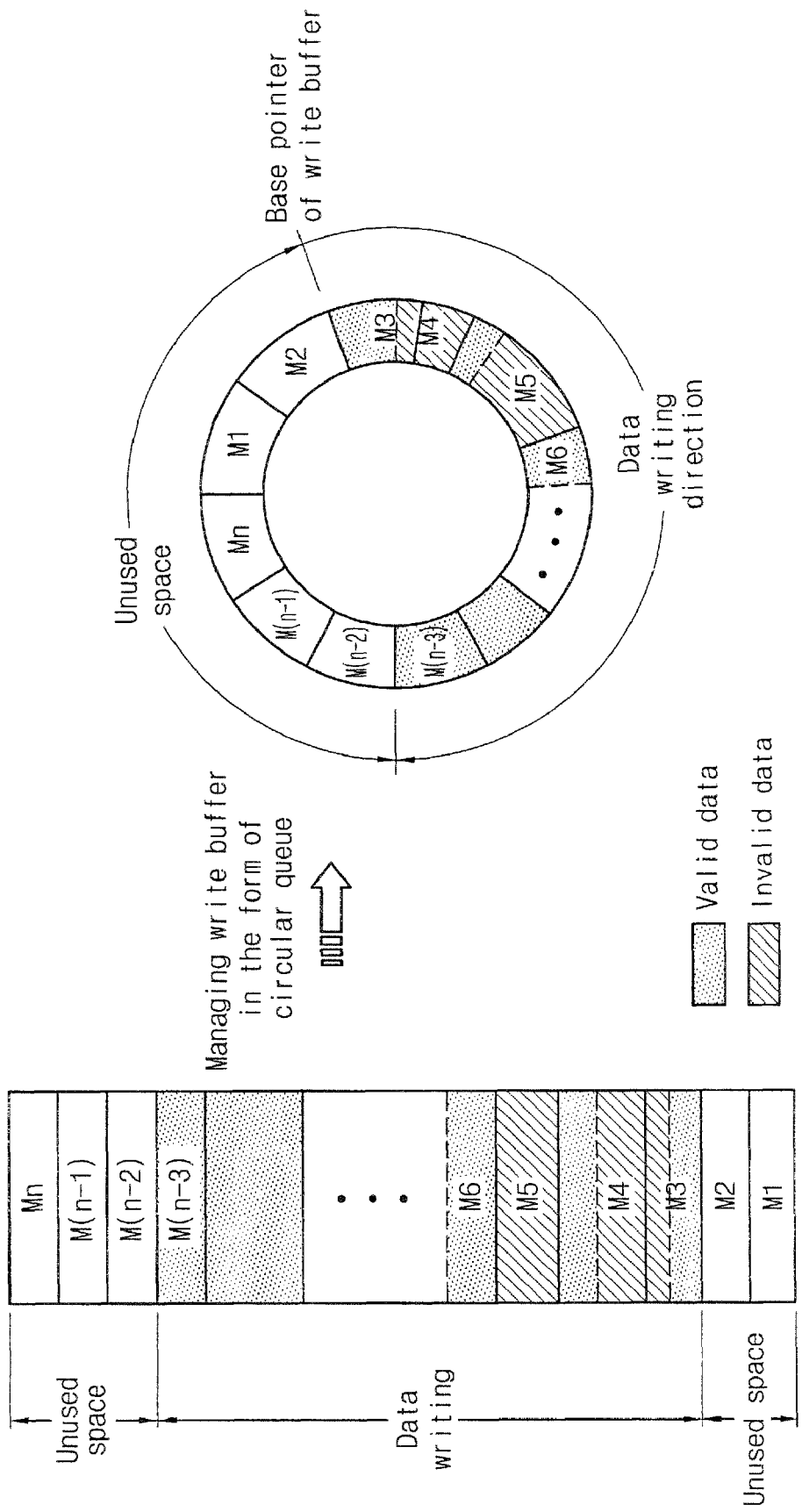
FIGS. 5, 6A to 6C and 7 are schematic diagrams illustrating operational features of a block reclaim in accordance with an embodiment of the present invention.

For example, as illustrated in FIG. 5, it is assumed that a flash memory having memory blocks M1~Mn is used as the write buffer of the data storage apparatus. The write buffer is managed in the pattern of a circular queue with a specific starting block address. This starting address is referred to as a 'base pointer' hereinafter. In FIG. 5, the base pointer, for instance, may be set to designate the memory block M3 initially. In this case, write data provided from the host are stored in order starting from the memory block M3 designated by the base pointer. Responding to a data write request from the host, the write data are sequentially written in the flash memory, i.e., the write buffer, in ascending (incrementing) order. Alternatively, the write data can be sequentially written in descending (decrementing) order. In the feature shown in FIG. 5, the data written from the host are stored in order from memory block M3 to memory block Mn-3. Thus, the unused space of the write buffer is composed of the remaining memory blocks M1, M2, Mn-2, Mn-1, and Mn.

A block reclaim operation for a write buffer managed in the above manner will now be described in more detail.

Figure 6:
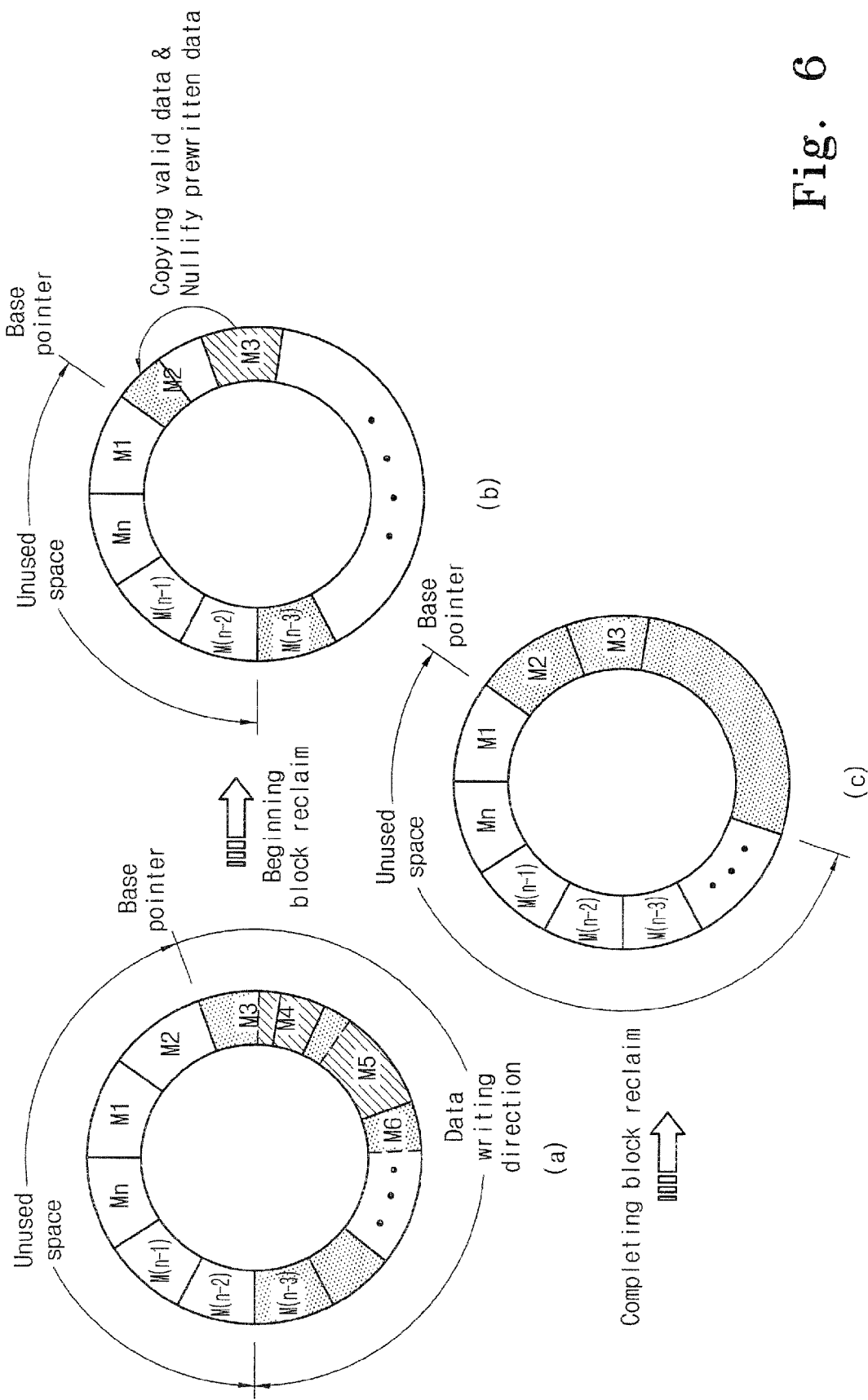

As data write requests are received from the host, the write data are sequentially written in the flash memory, i.e., the write buffer, in ascending (incrementing) order. According to repeated write operations, as illustrated in FIG. 6A, the unused space becomes insufficient in the write buffer. In this case, the base pointer may first be altered.

When the write data are stored in the flash memory in ascending (incrementing) order of the memory blocks, the base pointer is altered in the opposite direction of the data writing order. Namely, as shown in FIG. 6B, the base pointer is altered to designate memory block M2 instead of memory block M3. But, other patterns of base pointer alteration may be utilized. As another example, when the base pointer is altered in the opposite direction as the data writing order, it may be changed by two or more memory blocks. In the example shown in FIG. 6B, as the data writing operation is carried out along the sequence of incrementing block addresses, the base pointer moves in the direction of decrementing block addresses. While the previous base pointer designates memory block M3, the current base pointer designates memory block M2 when the block reclaim operation begins. If the block reclaim operation begins while the base pointer designates the memory block M1, the write buffer is managed in the form of circular queue and the base pointer designates the memory block Mn.

Once the base pointer is altered, valid data of a memory block designated by the previous base pointer are stored in the memory block designated by the current (new) base pointer. Since the memory block, which has a lower block address than the memory block designated by the former base pointer, is included in the unused space, memory block M2 designated by the new base pointer does not store valid data. But, according to the scheme for managing the flash memory, it may be accompanied by a block erasing operation on memory block M2 designated by the new base pointer.

As illustrated in FIG. 6B, valid data copied from a memory block designated by the previous base pointer are sequentially written in order from the memory block designated by the new base pointer. Alter one block is fully written, new memory blocks are arranged in the data writing direction (e.g., the direction of ascending block addresses). Since only valid data are copied in the block reclaim operation, it assures there is no invalid data are arranged along with the valid data when the new memory blocks are arranged along the data writing direction. Therefore, by managing the write buffer by means of physical address mapping, it is possible to conduct the block reclaim operation when the unused space of the write buffer includes at least one memory block. After completing the block reclaim operation, as illustrated in FIG. 6C, the storage space occupied by invalid data is reclaimed. The reclaimed storage space is reusable as unused space. By reclaiming and reusing memory blocks storing invalid data, as described above, it is possible to minimize the frequency of the buffer flush operations.

Memory blocks may be divided into pages, and a single memory block may contain some pages of valid data and other pages of invalid data. When copying valid data into the new memory blocks in order to reclaim the memory blocks storing invalid data, it is allowable to copy only valid data pages by examining data fields that identify valid/invalid data pages and by reading identifiers respective to the data pages. But this selective copying mode requires reading all of the data pages or identifiers. To sort out valid data pages without reading the entire data pages, a data storage apparatus of the present invention may identify valid data pages by means of an active page list table (hereinafter, referred to as an 'APL' table).

Figure 7:
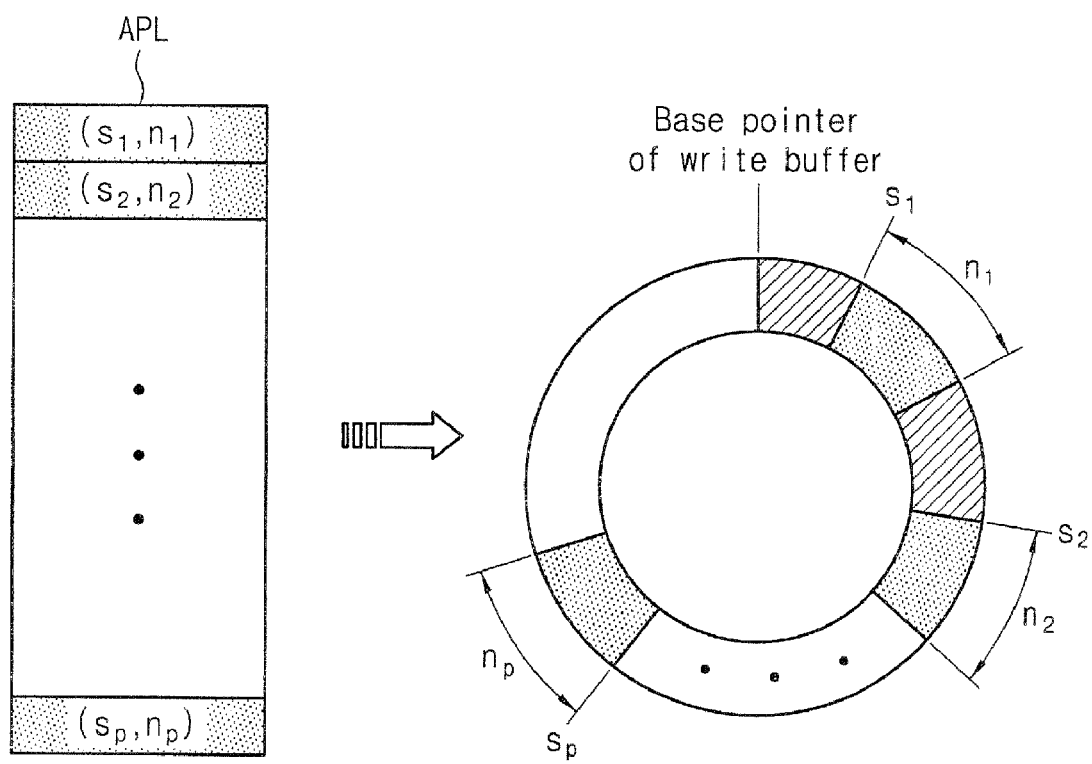

Referring to FIG. 7, the APL table contains APL information arranged in the order of addresses of the flash memory. The APL information includes address information Si (i=1~p) representing a starting address (including a memory block address and a page address) of pages storing valid data, and page information Ni representing the number of the pages storing valid data. The APL table may be organized from the mapping information of the write buffer. With the APL table, it is possible to copy only valid data in accordance with the APL information during the block reclaim operation.

A virtual address mapping scheme, which is different from a physical address mapping scheme, may also be also be utilized in managing the write buffer for the data storage apparatus. Hereinafter a block reclaim technique using a virtual address mapping scheme for the data storage apparatus will be described in detail.

Figure 8:
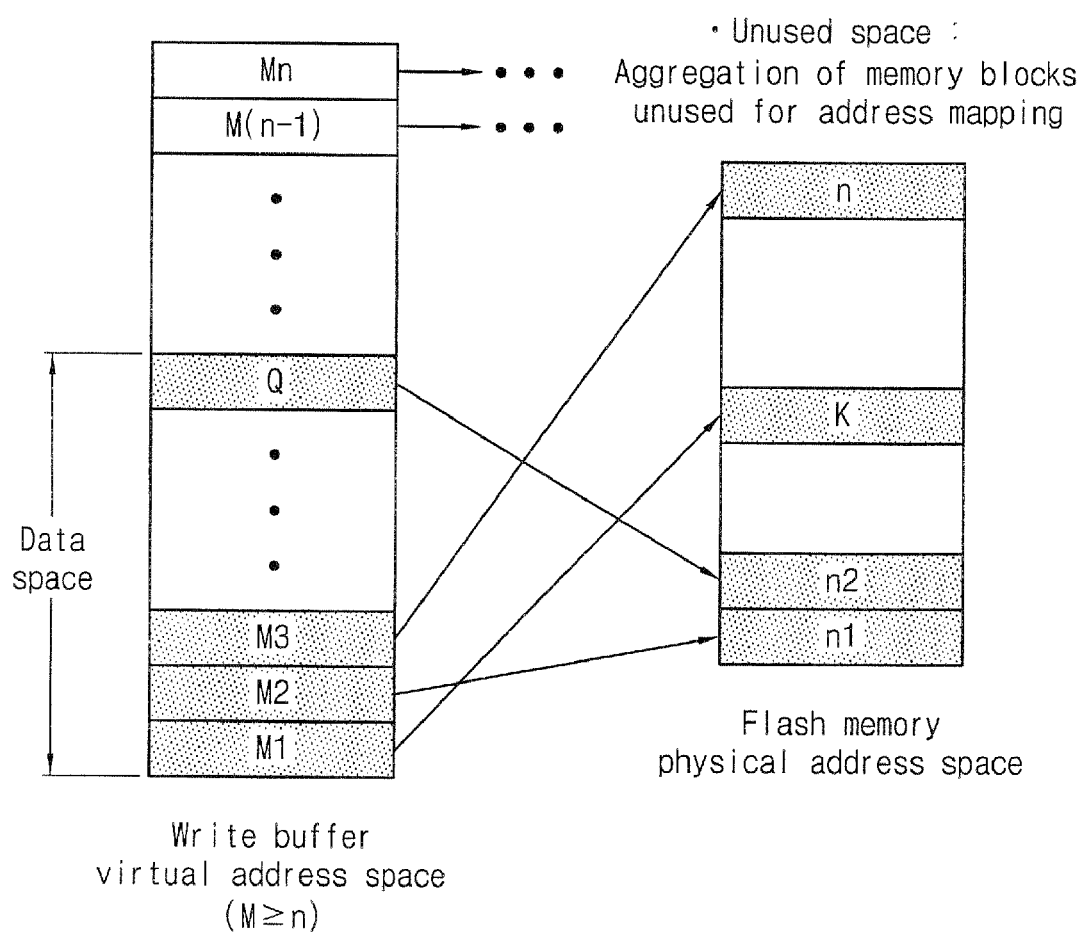
FIGS. 8, 9 and 10A to 10C are schematic diagrams illustrating operational features of a block reclaim in accordance with another embodiment of the present invention.

Virtual address mapping means that a data writing operation is carried out in the direction of incrementing (or decrementing) block addresses in a logical address space of the write buffer, and these logical blocks are mapped to optional physical blocks of the flash memory. For instance, as the number of the logical blocks, M, would be larger than that of the physical blocks, N, as illustrated in FIG. 8, the logical blocks are dynamically assigned to the physical blocks in a data waiting operation. Namely, the physical blocks are not allocated to the logical blocks until they are used for a data writing operation, but allocated in accordance with the block management scheme whenever there is a need for an additional memory block in response to a data write request from the host.

Hereinafter a block reclaim operation with virtual address mapping will be described in detail.

Figure 9:
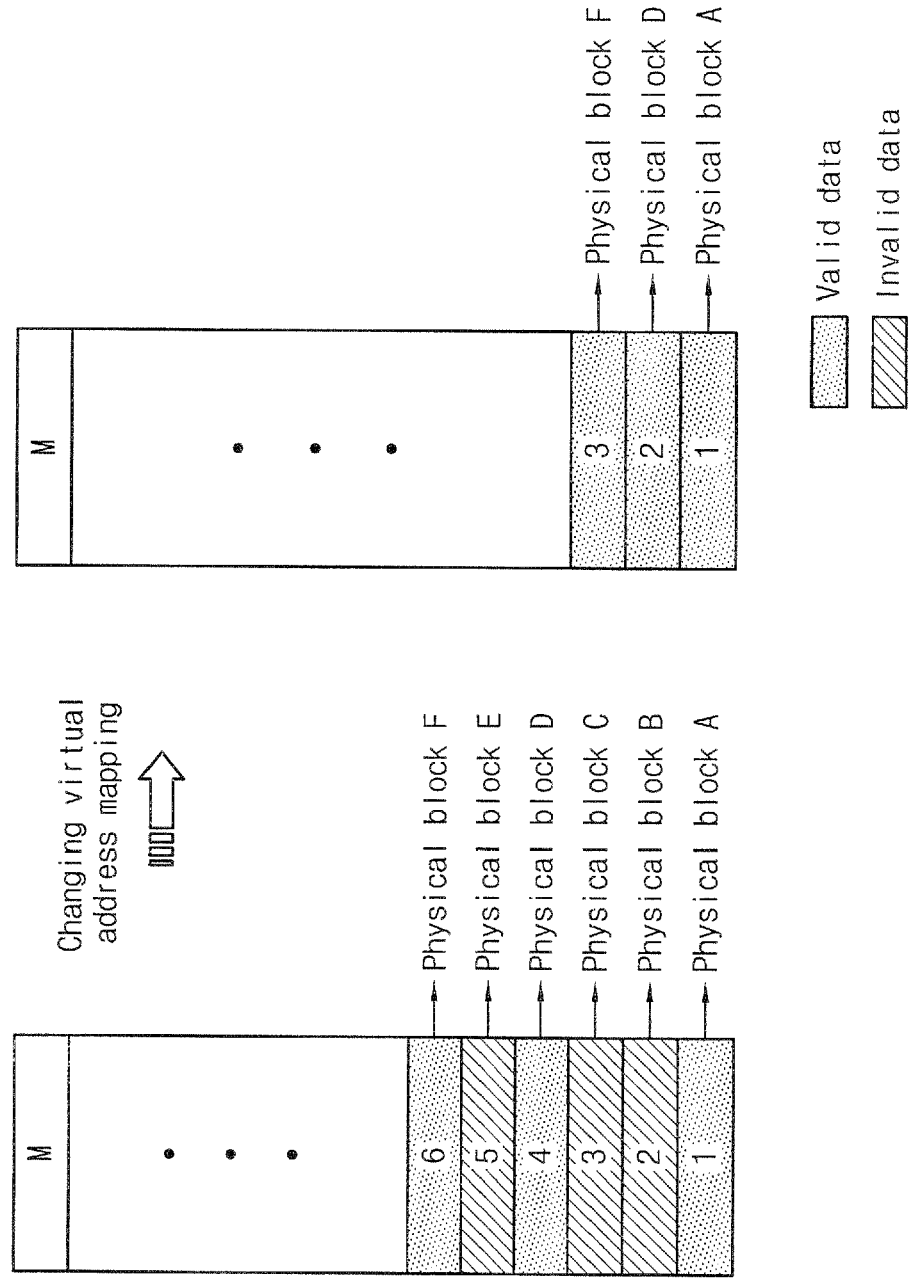

First, referring to FIG. 9, a block reclaim operation is accomplished by removing a logical-physical address mapping for a memory block (hereinafter, referred to as 'invalid block') only storing invalid data and altering a logical-physical address mapping for a memory block (hereinafter, referred to as 'valid block') including at least a page storing valid data. After completing the block reclaim operation, a virtual address space of the write buffer is arranged so that the valid blocks have successive virtual block addresses. Thus, it is possible to reclaim the invalid blocks without copying data.

Then, when a new memory block is needed in response to a data write request from the host, the reclaimed memory blocks may be reused by means of a new logical-physical address mapping. In FIG. 9, assuming that an invalid block is mapped to the physical blocks (e.g., B, C and E) of the flash memory, the block reclaim operation is carried out to remove the logical-physical address mapping to the physical blocks B, C and E. Thereafter, the memory blocks B, C, and F are reusable. This procedure is referred to as virtual block address compaction (VBAC).

On the other hand, a memory block having valid and invalid data mixed therein may be also reclaimed by way of the following procedure. Rather than simply altering a logical-physical address mapping without copying data as in the former procedure, valid data stored in a valid block are copied into another memory block and the valid block is then treated as an invalid block. The originally invalid blocks and the invalid blocks abstracted in this way may be reclaimed through the procedure (removing the logical-physical address mapping for the invalid blocks) illustrated in FIG. 9. This procedure is referred to as physical garbage block collection (PGBC).

Figure 10:
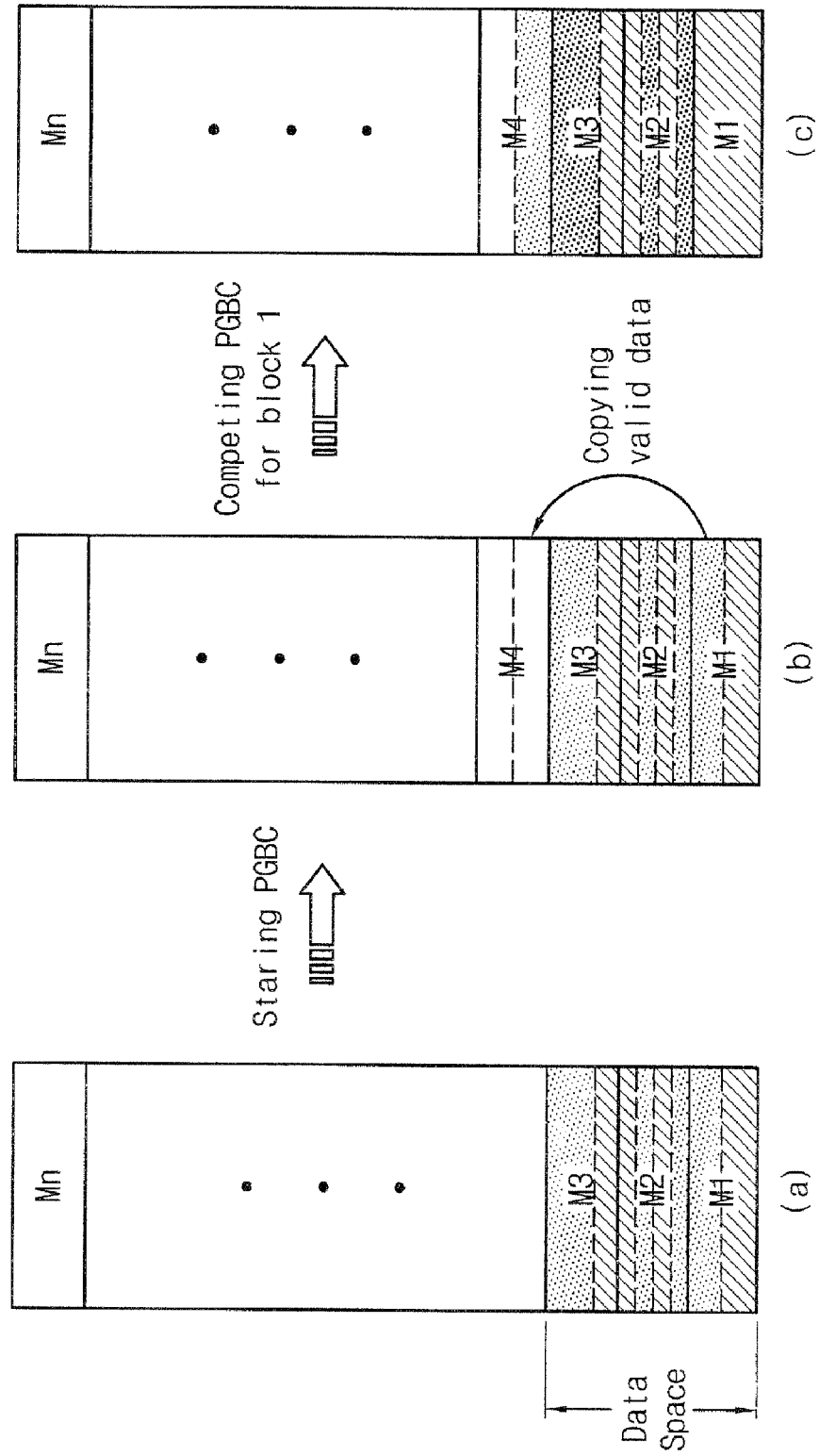

In a PGBC procedure, data is copied between different memory blocks. For instance, FIG. 10A illustrates an example in which valid and invalid data are mixed in memory blocks before the PGBC procedure. Once the PBGC procedure begins, as shown in FIG. 10B, valid data stored in a memory block are copied into an empty memory block. After completing the data copy into the empty memory block, as shown in FIG. 10C, the memory block (e.g., M1) that stored valid data becomes an invalid block. Then, through the aforementioned VBAC procedure, the logical-physical address mapping for the invalid blocks is removed to reclaim the invalid blocks. Such reclaimed memory blocks will be reused thereafter for storing other valid data.

By evaluating the number of pages of valid data (i.e., the amount of data copying required for abstracting invalid blocks) in the PGBC procedure, it is possible to define a cost for copying data from each block and to sort the invalid blocks by identifying the minimum data copy operations from selected blocks. Then, invalid blocks which have lower data copy costs can be targeted to be abstracted with higher priority. Such optimization helps to minimize the time for abstracting the invalid blocks. Further, in abstracting the invalid blocks with the lower cost for copying data, the APL table mentioned above may be utilized in order to read only valid data pages without having to read all of the pages.

Compared to physical address mapping, virtual address mapping is able to greatly reduce the amount of copied data required for a block reclaim operation. Additionally, there is an advantage in partially conducting a block reclaim operation by separating the step of abstracting the invalid blocks and the step of reclaiming the invalid blocks by altering the logical-physical address mapping. But, there is a burden in retaining mapping information from a virtual address space of the write buffer to a physical address space of the flash memory. Moreover, frequent alteration of mapping information makes it more difficult to recover from a power failure.

Figure 11:
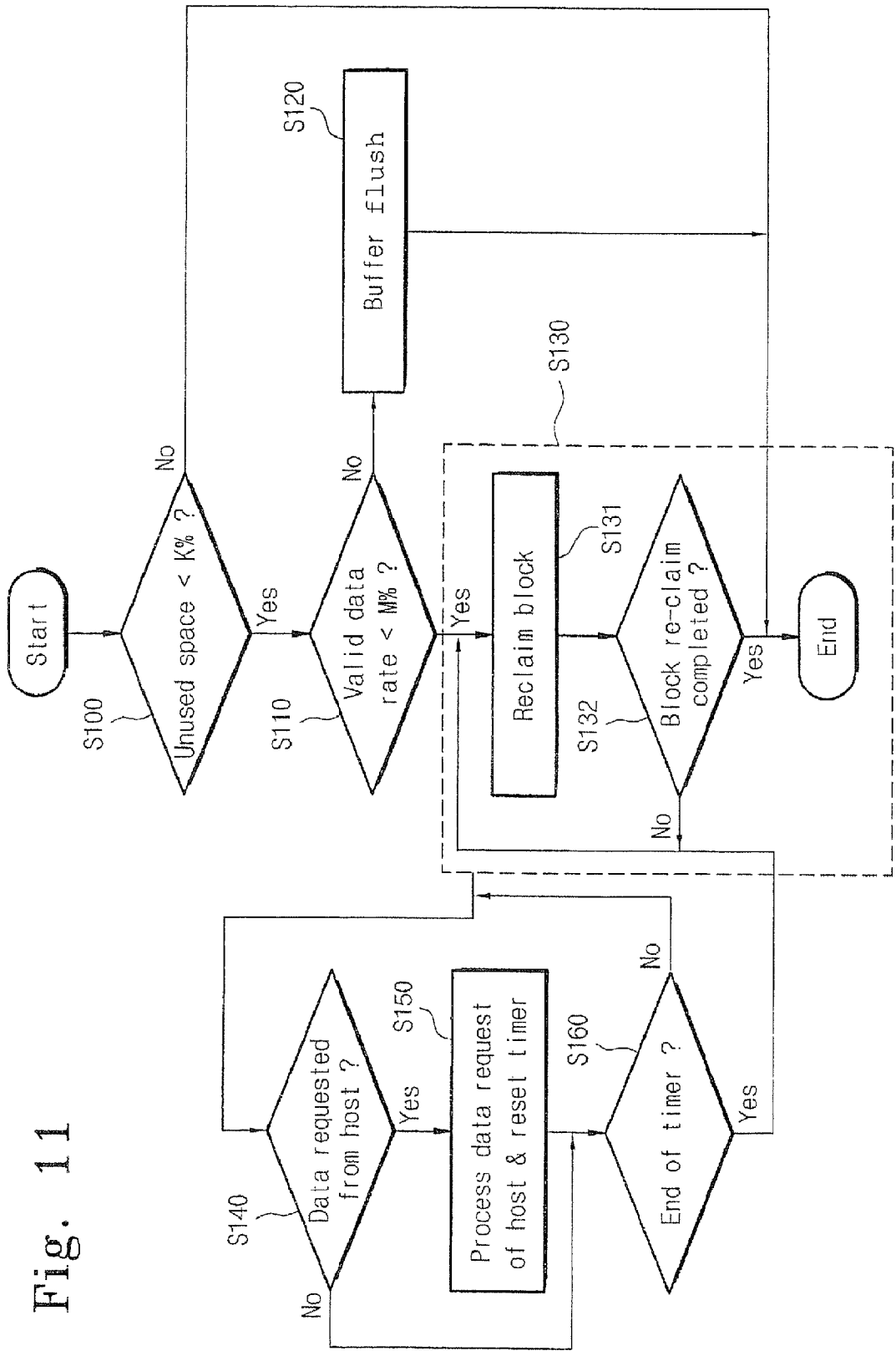
FIG. 11 is a flow chart showing the block reclaim operation of a data storage apparatus in accordance with another embodiment of the present invention.

FIG. 11 is a flow chart illustrating a method for managing the write buffer of a data storage apparatus (including the block reclaim operation) in accordance with the present invention.

Once the block reclaim procedure begins, it determines whether the unused space of the write buffer is empty less than a reference value (K %) (S100). As mentioned above, the block reclaim operation is carried out to secure additional space when the unused data storage space is insufficient in the write buffer. As also stated above, in order to prevent a delay in the response time for a data request from the host, it is necessary to process the data write request of the host by using the write buffer even during the block reclaim operation. Therefore, additional unused space is needed in the write buffer even at the beginning of the block reclaim operation. Namely, it is preferred to start the block reclaim operation when the unused space in the write buffer is still has a predetermined volume to accommodate the performance of the whole system. For this requirement, a block reclaim operation of the present invention may begin when the unused space of the write buffer is under a specific rate K % of the whole storage space of the write buffer.

In the step S100, if the unused space is greater than the reference value K %, the block reclaim procedure is terminated. If the unused space is determined to be less than K % of the whole space of the write buffer, the procedure next determines whether the amount of valid data stored in the write buffer is less than a second reference value M % (S110). Even when the unused space in the write buffer is less than K %, it is preferable to conduct the buffer flush operation, rather than the block reclaim operation, if the amount of valid data is greater than M %. Namely, it is advantageous to reuse storage space occupied by invalid data by way of a block reclaim operation when the occupation rate of the invalid data is high in previously used data storage space in the write buffer. But, when invalid data occupy a low volume in the write buffer, it is preferred to conduct the buffer flush flash operation because the amount of copied data for the block reclaim operation is so large and the data storage space securable by the block reclaim operation is too small.

If the amount of valid data stored in the write buffer is greater than the reference value M %, the buffer flush operation is enabled (S120). Namely, the valid data stored in the write buffer are transferred into the disc under regulation of the controller. Otherwise, if the amount of valid data stored in the write buffer is detected as being lower than the reference value M %, the block reclaim operation is enabled (S130). The block reclaim operation may be carried out through one of the aforementioned ways. For instance, of the write buffer of the data storage apparatus is managed by physical address mapping, the block reclaim operation may be carried out in accordance with the procedure illustrated in FIGS. 5 through 7. Otherwise, the write buffer of the data storage apparatus is managed by virtual address mapping, the block reclaim operation may be carried out in accordance with the procedure illustrated in FIGS. 8 through 10C. The block reclaim operation includes a step (S131) of reclaiming invalid blocks through the aforementioned steps and a step (S132) of determining whether the block reclaim operation has been completed.

Referring again to FIG. 11, during the block reclaim operation, it is determined whether there is a request for data transmission from the host (S140). If there is a request for data transmission, the block reclaim operation is suspended to conduct the data transfer operation requested by the host (S150). At the same time, a timer is reset. The arrow leading to step (140) is shown originating from the block reclaim operation (130) to indicate that the determination of whether there is a request for data transmission from the host may occur concurrently with the block reclaim operation (130).

Here, the timer is used for the following reasons. When there is a data read/write request from the host, it is highly probably that an additional data read/write request will be generated again by the host within a short time period. Thus, in the block reclaim technique proposed by the present invention, when there is a data read/write request from the host during the block reclaim operation, the block reclaim operation is first suspended to process the data read/write request of the host in priority. After completing a process for the data read/write request from the host, the block reclaim operation is resumed only after a predetermined time in which there is no further data request from the host. The timer is used to count the predetermined time to check whether there is a data transmission request from the host.

Once the data transmission is carried out, the timer checks whether the predetermined time has passed (S160). If the predetermined time has not been expired yet, the procedure goes to step S140. If the timer determines the predetermined time has expired, the procedure goes to step S130 to resume the suspended block reclaim operation. After step S132 determines that the block reclaim operation is completed, the whole procedure of block reclaim is terminated.

A block reclaim operation according to the present invention involves moving valid data from a memory block to another memory block in the flash memory. The data copy operation includes reading, writing, and block-erasing data in the flash memory, all of which take time. Because of that, as illustrated in conjunction with FIG. 11, when there is a request for a read/write operation from the host during the block reclaim operation, the block reclaim operation is conducted as a background process in order to minimize the effect on the response time for the request. Namely, the block reclaim operation is assigned a lower priority than the data transfer operation which is requested by the host. According to the established priorities, the block reclaim operation and the data transfer operation are properly scheduled to minimize degradation of performance due to delay of the response time for the data request from the host.

In a data storage apparatus according to the present invention, the block reclaim operation aforementioned may be automatically carried out under regulation of the controller 8 shown in FIG. 1. The aforementioned timer functions may also be provided in the controller 8. The above-disclosed subject matter is to be considered illustrative, and not restrictive, and the appended claims are intended to cover all such modifications, enhancements, and other embodiments, which fall within the true spirit and scope of the present invention.

As described above, it is possible to minimize the frequency of buffer flush operations by reclaiming memory blocks storing invalid data. It is also able to reduce the power consumption of the data storage apparatus owing to the reduced frequency of the buffer flush operations. Moreover, the reduced frequency of buffer flush operations contributes to enhancing the endurance of the data storage apparatus.

The invention claimed is:

1. A data storage apparatus comprising:
    a storage medium;
    a flash memory buffer configured to store write data to be written in the storage medium; and
    a controller configured to regulate a data transfer operation between the flash memory buffer and the storage medium,
    wherein the controller compares the amount of unused space, as a percentage of a whole storage space of the flash memory buffer, in the flash memory buffer to a first reference value and compares the amount of valid data in the flash memory buffer to a second reference value, and in response to the comparisons, conducts either a block reclaim operation on the flash memory buffer or a buffer flush operation to transfer valid data from the flash memory buffer to the storage medium,
    wherein, when the controller receives an external request for a data transfer operation during the block reclaim operation, the controller suspends the block reclaim operation to conduct the requested data transfer operation, and wherein the controller resumes the suspended block reclaim operation if an additional request for a data transfer operation is not received during a predetermined time.

2. The data storage apparatus as set forth in claim 1 wherein, when the amount of unused space in the flash memory buffer is less than the first reference value and the amount of valid data in the flash memory buffer is less than the second reference value, the controller begins the block reclaim operation on memory blocks storing invalid data in the flash memory buffer.

3. The data storage apparatus as set forth in claim 1 wherein, when the amount of unused space in the flash memory buffer in less than the first reference value and the amount of valid data in the flash memory buffer greater than the second reference value, the controller conducts the buffer flush operation to move valid data from the flash memory buffer into the storage medium.

4. The data storage apparatus as set forth in claim 1 wherein, when the flash memory buffer is managed in accordance with a physical address mapping, memory blocks storing invalid data are reclaimed and reused by shifting a base pointer by one or more memory blocks into an unused space and copying data from a memory block designated by a previous base pointer into a memory block designated by the current base pointer.

5. The data storage apparatus as set forth in claim 4 wherein the block reclaim operation for reclaiming the memory blocks storing the invalid data is carried out with reference to information about the number of pages and a start address of valid data stored in an active page list table.

6. The data storage apparatus as set forth in claim 1 wherein, when the flash memory buffer is managed in accordance with a logical address mapping, memory blocks storing invalid data are reclaimed and reused by removing a logical-physical address mapping of a memory block having only invalid data and altering a logical-physical address mapping of a memory block having at least a page storing valid data.

7. The data storage apparatus as set forth in claim 6 wherein, when a first memory block stores both valid and invalid data, the first memory block is reclaimed and reused by copying valid data from the first memory block into an empty memory block, rendering the first memory block as an invalid block, and removing a logical-physical address mapping of the first memory block.

8. A method for managing a data storage apparatus having a storage medium and a flash memory buffer for storing data to be written into the storage medium, the method comprising:

determining whether unused space, as a percentage of a whole storage space of the flash memory buffer, occupies the flash memory buffer at a rate lower than a first reference value;

determining whether a valid data rate in the flash memory buffer is lower than a second reference value when the unused space occupies the flash memory buffer at a rate smaller than the first reference value;

conducting a block reclaim operation on the flash memory buffer when the valid data rate in the flash memory buffer is lower than the second reference value;

determining whether there is an external request for a data transfer operation during the block reclaim operation, suspending the block reclaim operation when there is an external request for a data transfer operation, and resuming the suspended block reclaim operation after a predetermined time following completion of the requested data transfer operation.

9. The method as set forth in claim 8, further comprising:

conducting a buffer flush operation on valid data in the flash memory buffer when the valid data rate is higher than the second reference value.

10. The method as set forth in claim 8 wherein, when the flash memory buffer is managed in accordance with a physical address mapping, memory blocks storing invalid data are reclaimed and reused by shifting a base pointer by one or more memory blocks into an unused space and copying data from a memory block designated by a previous base pointer into a memory block designated by the current base pointer.

11. The method as set forth in claim 10 wherein the block reclaim operation for reclaiming the memory blocks storing the invalid data is carried out with reference to information about the number of pages and a start address of valid data stored in an active page list table.

12. The method as set forth in claim 8 wherein, when the flash memory buffer is managed in accordance with a logical address mapping, memory blocks storing invalid data are reclaimed and reused by removing a logical-physical address mapping of a memory block having only invalid data and altering a logical-physical address mapping of a memory block having at least a page storing valid data.

13. The method as set forth in claim 12 wherein, when a first memory block stores both valid and invalid data, the first memory block is reclaimed and reused by copying valid data from the first memory block into an empty memory block, rendering the first memory block as an invalid block, and removing a logical-physical address mapping of the first memory block.

14. The method as set forth in claim 8 wherein performing the reclaim operation comprises physically moving data by copying the data from a first block to a second block in the nonvolatile memory buffer.

15. The method as set forth in claim 8 wherein performing the reclaim operation comprises virtually moving data by changing logical-physical address mappings.

16. The method as set forth in claim 8 further comprising performing a physical garbage block collection on a memory block having both valid and invalid data in the nonvolatile memory buffer.

* * * * *